Figure 1:
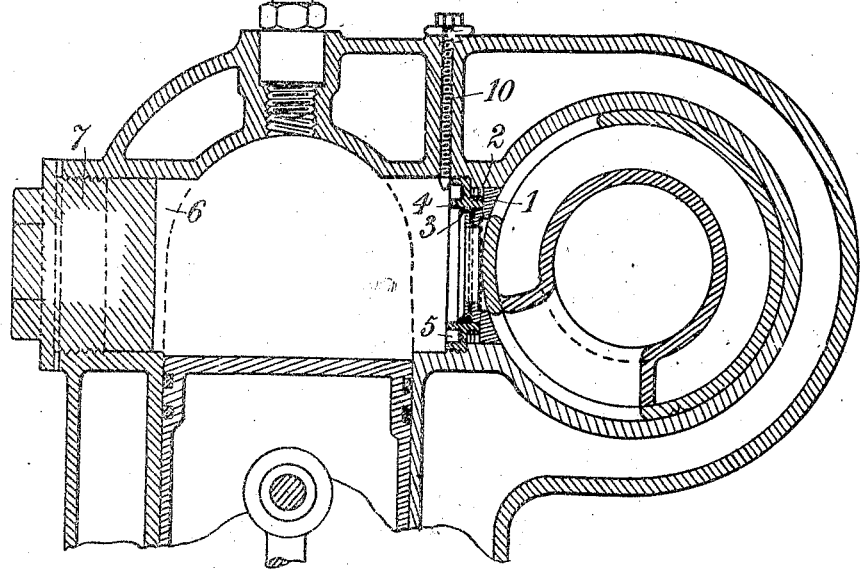

E. H. TARTRAIS.
ROTARY VALVE PACKING.
APPLICATION FILED JUNE 15, 1912.

1,057,297.

Patented Mar. 25, 1913.

Witnesses:

Inventor:
Eugene H. Tartrais
by F. Dittmar
Attorney

UNITED STATES PATENT OFFICE.

EUGÈNE HENRI TARTRAIS, OF MONTMORENCY, FRANCE.

ROTARY-VALVE PACKING.

1,057,297.

Specification of Letters Patent.  Patented Mar. 25, 1913.

Application filed June 15, 1912. Serial No. 703,652.

*To all whom it may concern:*

Be it known that I, EUGÈNE HENRI TARTRAIS, a citizen of the French Republic, and residing at Montmorency, Seine et Oise, France, have invented certain new and useful Improvements in Rotary-Valve Packing, of which the following is a specification, reference being had therein to the accompanying drawing.

The present invention relates to improved means or device for fixing hermetic packing such as and more or less similar to that described in the specification of my application for a patent to the United States Patent Office Serial No. 645,361 of 22nd of August 1911, and is employed to tighten the rotary valves such as and similar to those described in the specification of application for British Letters Patent filed under No. 11268 on the 11th of May 1912, the said valve or valves being arranged at the side of the cylinder or cylinders as it is shown in the drawings of the last mentioned application.

The object of my invention is to obtain a better accessibility into the valve, in order to facilitate the removal and replacement of the parts, without the necessity of having to dismount the valve as is necessary in connection with engines now in use.

Figure 2:
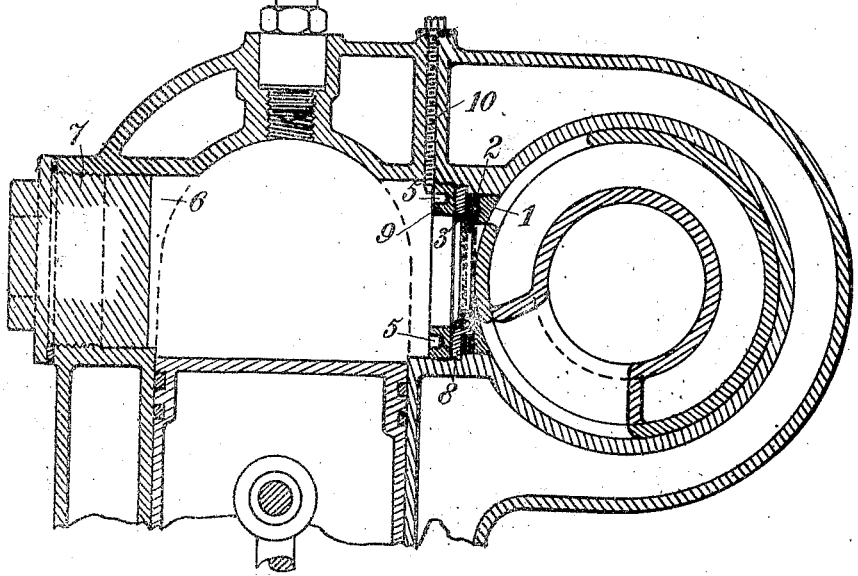

In the accompanying drawings two forms of carrying out my invention are shown by way of example. Figures 1 and 2 showing similar cross sections through the valves, the section plane passing also through the axis of the cylinder.

According to Fig. 1 the packing 1 with its spring washer 2 and a second packing 3 are arranged within a ring 4 of any convenient form. The rings are fixed in the cylinders by means of a special key such as or similar to that described in the Belgium Patent No. 236587 of the 17th of June 1911 having projections for example, coacting with holes 5 in the ring. To allow of fixing the same, an opening 6 is provided in the opposite wall of the cylinder and is normally closed by a plug or the like 7.

Fig. 2 shows a modification in which the ring itself, which keeps the hermetic packing members, is not threaded but is simply a face ring as shown at 8 where it will be seen that it is quite plain and is kept in its place by a threaded ring 9.

In both figures 10 represents a set screw which prevents an undue back motion of the rings.

Having now described my invention what I claim and desire to secure by Letters Patent is:

In rotary valve packings, a cylinder, a valve arranged at the side of said cylinder, there being an opening in the cylinder wall opposite said valve, a threaded ring screwed into said cylinder opposite said opening, a packing ring in contact with said valve, a washer between said rings and means to stop said opening, as specified.

In testimony whereof I affix my signature in the presence of two witnesses.

EUGÈNE HENRI TARTRAIS.

Witnesses:
CHARLES BLONDEL,
H. C. COXE.